(12) United States Patent
Inoue (10) Patent No.: US 7,217,216 B2
(45) Date of Patent: May 15, 2007

(54) CONTINUOUSLY VARIABLE TRANSMISSION APPARATUS

(75) Inventor: Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/453,864

(22) Filed: Jun. 16, 2006

(65) Prior Publication Data

US 2006/0234823 A1   Oct. 19, 2006

Related U.S. Application Data

(62) Division of application No. 10/727,628, filed on Dec. 5, 2003, now Pat. No. 7,094,171.

(30) Foreign Application Priority Data

Dec. 5, 2002   (JP)   ............... P. 2002-353254

(51) Int. Cl.
    *F16H 15/50*   (2006.01)
(52) U.S. Cl. ............... 475/215; 475/217; 475/218; 475/219
(58) Field of Classification Search ......... 475/214–219
    See application file for complete search history.

(56) References Cited

U.S. PATENT DOCUMENTS

| | | | |
|---|---|---|---|
| 5,453,061 A | 9/1995 | Fellows | |
| 6,217,473 B1 | 4/2001 | Ueda et al. | |
| 6,251,038 B1 | 6/2001 | Ishikawa et al. | |
| 6,251,039 B1 | 6/2001 | Koga | |
| 6,358,178 B1 * | 3/2002 | Wittkopp | 475/207 |
| 6,723,016 B2 * | 4/2004 | Sumi | 475/216 |
| 6,866,606 B2 * | 3/2005 | Ooyama | 475/216 |
| 2003/0060318 A1 | 3/2003 | Sumi | |

FOREIGN PATENT DOCUMENTS

| | | |
|---|---|---|
| EP | 0120636 | 10/1984 |
| GB | 2274315 | 7/1994 |
| JP | 1-169169 A | 7/1989 |
| JP | 9-210175 A | 8/1997 |
| JP | 9-210191 A | 8/1997 |
| JP | 2-778038 B2 | 5/1998 |

* cited by examiner

*Primary Examiner*—Ha Ho
(74) *Attorney, Agent, or Firm*—Sughrue Mion, PLLC (57) ABSTRACT

A continuously variable transmission apparatus, has: an input shaft; a toroidal-type continuously variable transmission; a rotation transmission shaft; first, second and third planetary-gear-type transmissions; a first power transmission mechanism; a second power transmission mechanism; a third power transmission mechanism; and, a switching mechanism, wherein the second sun gear and one of the first and third sun gears are rotated together with the rotation transmission shaft to thereby execute the power transmission through the rotation transmission shaft and one of the first and second planetary-gear-type transmissions, and, in a state where the power transmission through the third planetary-gear-type transmission is cut off, in accordance with the control of the transmission ratio of the toroidal-type continuously variable transmission, the output shaft is stopped while the input shaft is rotating.

1 Claim, 4 Drawing Sheets

CONTINUOUSLY VARIABLE TRANSMISSION APPARATUS

This is a divisional of Application Ser. No. 10/727,628 filed Dec. 5, 2003 now U.S. Pat. No. 7,094,171. The entire disclosure of the prior application, application Ser. No. 10/727,628, is hereby incorporated by reference.

BACKGROUND OF THE INVENTION

1. Technical field of the Invention

The present invention relates to an improvement in a continuously variable transmission apparatus incorporating therein a toroidal-type continuously variable transmission for use as an automatic transmission apparatus for a car.

2. Description of the Related Art

Figure 3:
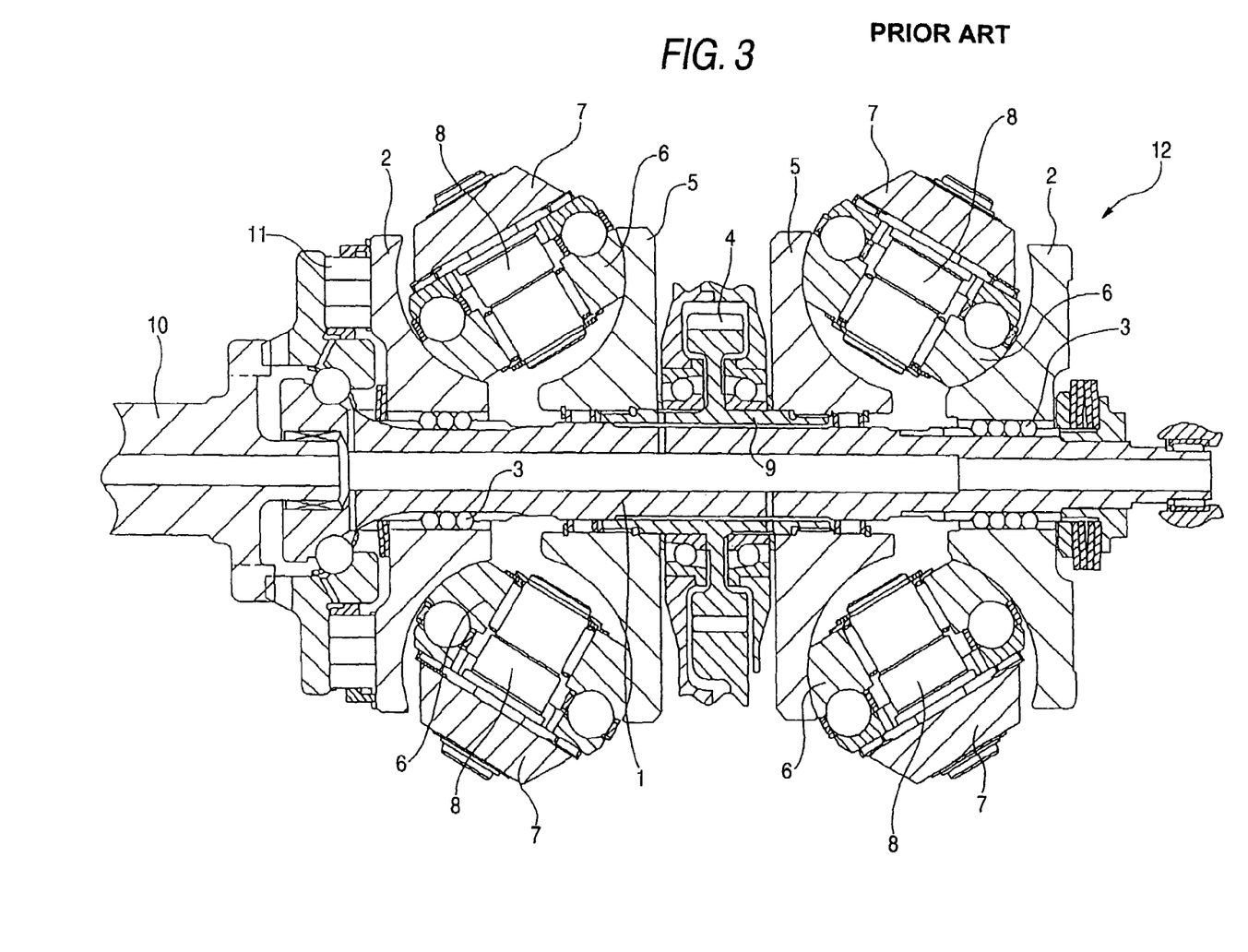
FIG. 3 is a section view of an example of a conventionally known toroidal-type continuously variable transmission; and, FIG. 4 is a section view of an example of a conventionally known continuously variable transmission apparatus.

As an automatic transmission apparatus for a car, use of such a toroidal-type continuously variable transmission as shown in FIG. 3 has been studied and enforced in part of the car industry. This is referred to as a toroidal-type continuously variable transmission of a double-cavity type, in which, on the peripheries of the two end portions of an input shaft 1, there are supported two input side disks 2, 2 through their associated ball splines 3, 3. Therefore, the two input side disks 2, 2 are respectively supported so as to be concentric with each other and can be rotated in synchronization with each other. Also, on the periphery of the middle portion of the input shaft 1, there is supported an output gear 4 in such a manner that it can be rotated with respect to the input shaft 1. And, two output side disks 5, 5 are respectively spline engaged with the two end portions of a cylindrical portion 9 disposed on the central portion of the output gear 4. Therefore, the two output side disks 5, 5 can be rotated in synchronization with the output gear 4.

Also, between the two sets of input side disks 2, 2 and output side disks 5, 5, there are interposed and held a plurality of (normally, two or three) power rollers 6, 6 in each set. These power rollers 6, 6 are rotatably supported on the inner surfaces of their associated trunnions 7, 7 through support shafts 8, 8 and a plurality of rolling bearings. The trunnions 7, 7 are respectively can be swung and shifted about their associated pair of pivot shafts which are disposed on the longitudinal-direction (in FIG. 3, the front-and-back-direction) two end portions of the trunnions 7, 7 in such a manner that they are concentric with each other in each set of trunnions 7, 7.

To operate the above-structured toroidal-type continuously variable transmission, using a drive shaft 10 connected to a power source such as an engine, one (in FIG. 3, the left-side) of the input-side disks 2 may be driven and rotated through such a pressing device 11 of a loading cam type as shown in FIG. 3 or an oil pressure type. As a result of this, the pair of input side disks 2, 2 supported on the two end portions of the input shaft 1 are rotated in synchronization with each other while they are being pushed in their mutually approaching directions. And, the rotation power of the two input side disks is transmitted to the output side disks 5, 5 through the power rollers 6, 6 and is then taken out from the output gear 4.

Now let us discuss a case in which the ratio of the rotation speed between the input shaft 1 and output gear 4. Firstly, to reduce the rotation speed between the input shaft 1 and output gear 4, the trunnions 7, 7 may be respectively swung to their associated positions shown in FIG. 3. And, the peripheral surfaces of the respective power rollers 6, 6, as shown in FIG. 3, may be respectively contacted with the near-to-center portions of the inner surfaces of the input side disks 2, 2 and the near-to-outer-periphery portions of the inner surfaces of the output side disks 5, 5. On the other hand, to increase the rotation speed between the input shaft 1 and output gear 4, the trunnions 7, 7 may be respectively swung in the opposite direction to the direction shown in FIG. 3; and, the trunnions 7, 7 may be respectively inclined in such a manner that the peripheral surfaces of the respective power rollers 6, 6, reversely to the state shown in FIG. 3, can be respectively contacted with the near-to-outer-periphery portions of the inner surfaces of the input side disks 2, 2 and the near-to-center portions of the inner surfaces of the output side disks 5, 5. By the way, in case where the inclination angle of the trunnions 7, 7 is set in the intermediate inclination angle, between the input shaft 1 and output gear 4, there can be obtained an intermediate transmission ratio (speed ratio).

Figure 4:
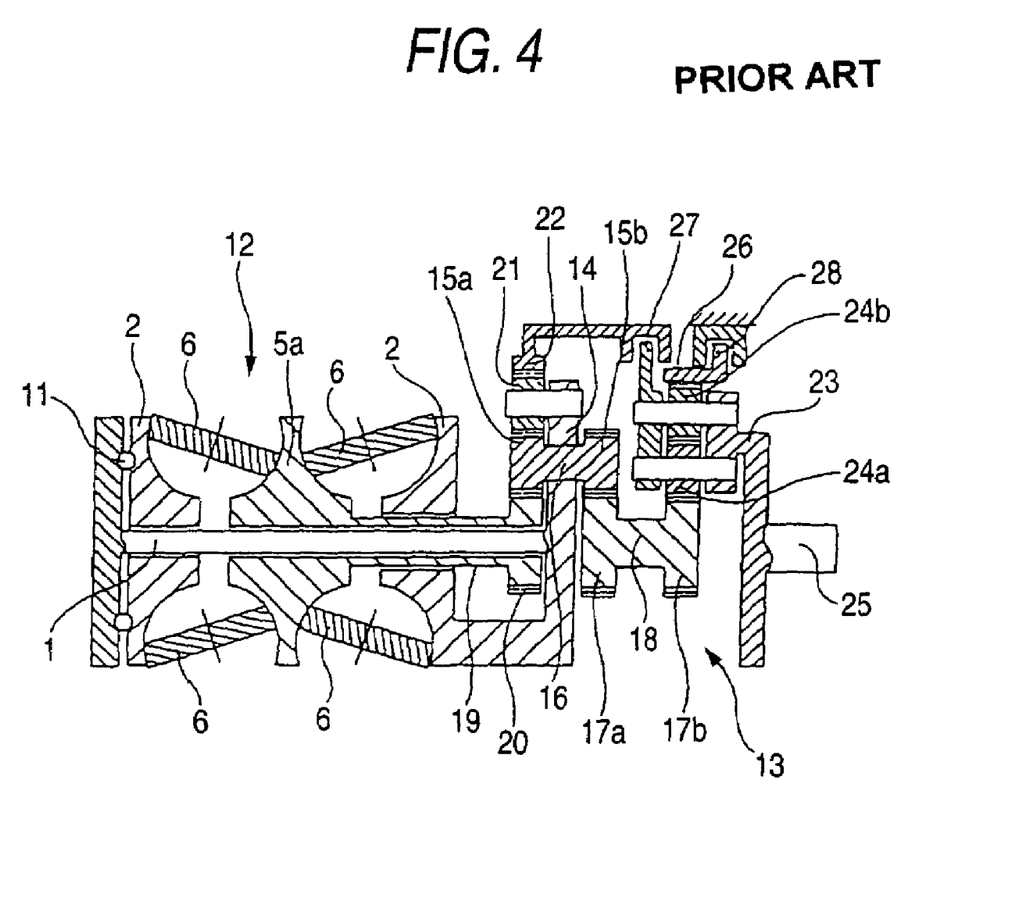

Further, conventionally, when incorporating the above-structured and -operatable into a continuously variable transmission for an actual car, there have been proposed various structures in which the toroidal-type continuously variable transmission is combined with a planetary gear mechanism to thereby provide a continuously variable transmission apparatus for a car, for example, structures as disclosed in U.S. Pat. No. 6,251,039 and JP-2778038. FIG. 4 shows, of the conventionally proposed continuously variable transmission apparatus, a continuously variable transmission apparatus disclosed in U.S. Pat. No. 6,251,039. This continuously variable transmission apparatus is composed of a combination of a toroidal-type continuously variable transmission 12 and a planetary-gear-type transmission 13. Of these transmissions, the toroidal-type continuously variable transmission 12 comprises an input shaft 1, a pair of input side disks 2, 2, an output side disk 5a, and a plurality of power rollers 6, 6. In the illustrated embodiment, the output side disk 5a has a structure in which the outer surfaces of a pair of output side disks are butted against each other to thereby form the two output side disks into an integral body.

Also, the planetary-gear-type transmission 13 includes a carrier 14 which is connected and fixed to the input shaft 1 and one (in FIG. 4, the right-side input side disk) of the two input side disks 2. And, on the diameter-direction intermediate portion of the carrier 14, there is rotatably supported a first transmission shaft 16 to the two end portions of which there are fixed two planetary gear elements 15a, 15b respectively. Also, a second transmission shaft 18, to the two end portions of which there are fixed two sun gears 17a, 17b respectively, is supported on the opposite side to the input shaft 1 with the carrier 14 between them in such a manner that it is concentric with the input shaft 1 and it can be rotated. And, the planetary gear elements 15a, 15b are respectively meshingly engaged with a sun gear 20 fixed to the leading end portion (in FIG. 4, the right end portion) of a hollow rotary shaft 19 having its base end portion connected to the output side disk 5a, or the sun gear 17a fixed to one end portion (in FIG. 4, the left end portion) of the second transmission shaft 18. Also, one (in FIG. 4, the left side) planetary gear element 15a is meshingly engaged, through another planetary gear element 21, with a ring gear 22 which is rotatably disposed on the periphery of the carrier 14.

On the other hand, another planetary gear elements 24a, 24b are rotatably supported on a second carrier 23 which is disposed on the periphery of the sun gear 17b fixed to the other end portion (in FIG. 4, the right end portion) of the second transmission shaft 18. By the way, the second carrier 23 is connected to the base end portion (in FIG. 4, the left end portion) of an output shaft 25 which is disposed concentrically with the input shaft 1 and second transmission shaft 18. Also, the planetary gear elements 24a, 24b are meshingly engaged with each other; and, one planetary gear element 24a is meshingly engaged with the sun gear 17b, whereas the other planetary gear element 24b is meshingly engaged with a second ring gear 26 which is rotatably disposed on the periphery of the second carrier 23. Further, the ring gear 22 and second carrier 23 can be engaged with and disengaged from each other by a low-speed clutch 27, while the second ring gear 26 and the fixed part of the continuously variable transmission apparatus such as a housing can be engaged with and disengaged from each other by a high-speed clutch 28.

In the case of the continuously variable transmission apparatus shown in FIG. 4, in a so called low speed mode state in which the low-speed clutch 27 is connected and the connection of the high-speed clutch 28 is cut off, the power of the input shaft 1 is transmitted through the ring gear 22 to the output shaft 25. And, by changing the transmission ratio of the toroidal-type continuously variable transmission 12, the transmission ratio of the whole of the continuously variable transmission apparatus, that is, the transmission ratio between the input shaft 1 and output shaft 25 can be changed. In such low speed mode state, the transmission ratio of the whole of the continuously variable transmission apparatus can be changed infinitely. That is, by controlling the transmission ratio of the toroidal-type continuously variable transmission 12, while the input shaft 1 is left rotating, the rotation state of the output shaft 25 can be changed between the forward and reversed rotation states thereof with a stop state between them.

By the way, during speed increasing operation in the above low speed mode state or during the constant speed running operation of a car, the torque passing through the toroidal-type continuously variable transmission 12 is transmitted from the input shaft 1 through the carrier 26, first transmission shaft 16, sun gear 20 and hollow rotation shaft 19 to the output side disk 5a, and is further applied from the outside disk 5a through the respective power rollers 6, 6 to the input side disks 2, 2. That is, the torque passing through the toroidal-type continuously variable transmission 12 during the speed accelerating or constant speed running operation circulate in a direction where the input side disks 2, 2 receive the torque from the power rollers 6, 6 respectively.

On the other hand, in a so called high speed mode state where the connection of the low-speed clutch 27 is cut off and the high-speed clutch 28 is connected, the power of the input shaft 1 is transmitted through the first and second transmission shafts 16, 18 to the output shaft 25. And, by changing the transmission ratio of the toroidal-type continuously variable transmission 12, the transmission ratio of the whole of the continuously variable transmission apparatus can be changed. In this case, as the transmission ratio of the toroidal-type continuously variable transmission 12 is increased, the transmission ratio of the whole of the continuously variable transmission apparatus can be increased.

By the way, during the speed increasing operation in such high speed mode state or constant speed running operation, the torque passing through the toroidal-type continuously variable transmission 12 is applied in a direction where the input side disks 2, 2 apply the torque to the power rollers 6, 6.

Although not shown, in JP-2,778,038, there is disclosed a continuously variable transmission apparatus structured such that a toroidal-type continuously variable transmission, two sets of planetary-gear-type transmissions, and four sets of clutches are combined together. According to such continuously variable transmission apparatus as disclosed in JP-2,778,038, by controlling the connection and disconnection of the four sets of clutches, there can be realized three kinds of modes on the advancing side and one kind of mode on the retreating side. And, not only the width of the transmission ratio on the advancing side can be increased but also, in the high-speed side two kinds of modes to be realized on the advancing side, the power passing through the toroidal-type continuously variable transmission can be controlled down to a low level, thereby being able to enhance the transmission efficiency of the whole of continuously variable transmission apparatus.

In the case of the above-mentioned conventional continuously variable transmission apparatus, since the toroidal-type continuously variable transmission and planetary-gear-type transmission are set coaxially with each other, the present continuously variable transmission apparatus becomes large in the axial-direction dimension thereof as a whole. Therefore, the above-mentioned conventional continuously variable transmission apparatus is not fit for a transmission for a front engine front drive car which has been widely spread mainly in the field of a small-sized car. In the case of the invention disclosed in JP-2778038, because it incorporates therein a so called single-cavity-type toroidal-type continuously variable transmission which includes an input side disk and an output side disk, the axial-direction dimension of the toroidal-type continuously variable transmission itself is short. However, as known widely, the single-cavity-type toroidal-type continuously variable transmission is poorer in transmission efficiency than the double-cavity-type toroidal-type continuously variable transmission shown in FIGS. 3 and 4. Therefore, when constituting a continuously variable transmission apparatus actually, as a toroidal-type continuously variable transmission, there is often used a double-cavity-type toroidal-type continuously variable transmission; however, in this case, as described above, the axial-direction dimension of the continuously variable transmission apparatus is inevitably increased. Also, in the case of the structure disclosed in JP-2778038, in addition to the input shaft of a toroidal-type continuously variable transmission, there are disposed two rotary shafts which are parallel to the input shaft. Due to this, the section area of the whole of the continuously variable transmission apparatus becomes large, which lowers the freedom of design thereof as a transmission for a small-sized car.

Further, in the case of the structure disclosed in JP-2778038, since there cannot be realized an infinite transmission ratio, in addition to the four sets of clutches, there is necessary a start mechanism such as a torque converter or an electromagnetic clutch. Due to this, the size of the whole of the continuously variable transmission apparatus becomes rather large, which makes it considerably difficult to employ the continuously variable transmission apparatus as a transmission for a small-sized FF car.

SUMMARY OF THE INVENTION

The present invention aims at eliminating the drawbacks found in the above-mentioned conventional structures. Accordingly, it is an object of the invention to provide a structure which can be reduced in the axial-direction dimension thereof and also can realize an infinite transmission ratio.

A continuously variable transmission apparatus according to the invention comprises an input shaft, a toroidal-type continuously variable transmission, a rotation transmission shaft, first, second and third planetary-gear-type transmissions, an output shaft, a first power transmission mechanism, a second power transmission mechanism, a third power transmission mechanism, and a switching mechanism. Of these composing elements, the toroidal-type continuously variable transmission is disposed concentrically with the input shaft and uses the input shaft as the input portion thereof.

And, the rotation transmission shaft is disposed in parallel to the input shaft.

The first, second and third planetary-gear-type transmissions are disposed on the periphery of the rotation transmission shaft in such a manner that they are concentric with each other around the rotation transmission shaft, while they respectively include first, second, third sun gears, first second and third ring gears, a plurality of first, second and third planetary gears meshingly engaged with their associated sun and ring gears, and first, second and third carriers supporting their associated planetary gears in such a manner that the planetary gears can be rotated.

Also, the output shaft is disposed concentrically with the rotation transmission shaft.

And, the first power transmission mechanism is used to transmit the rotation of the input shaft to the first ring gear or first carrier constituting the first planetary-gear-type transmission.

Also, the second power transmission mechanism is used to transmit the rotation between the output portion of the toroidal-type continuously variable transmission and rotation transmission shaft.

The third power transmission mechanism is used to transmit the rotation of the input shaft to the third ring gear or third carrier constituting the third planetary-gear-type transmission.

Further, the switching mechanism is used to switch the power transmission states between the input shaft and the output shaft through the first, second and third power transmission mechanisms, According to the present invention, of the first, second and third sun gears constituting the first, second and third planetary-gear-type transmissions respectively, the second sun gear and one of the first and third sun gears can be rotated together with the rotation transmission shaft.

And, in a state where the power transmission through the rotation transmission shaft and the first or second planetary-gear-type transmission is allowed but the power transmission through the third planetary-gear-type transmission is cut off, in accordance with the control of the transmission ratio of the toroidal-type continuously variable transmission, the output shaft can be stopped while leaving the input shaft rotating.

According to a first aspect of the present invention, there is a continuously variable transmission apparatus, having: an input shaft; a toroidal-type continuously variable transmission disposed concentrically with the input shaft, including an input portion and an output portion and using the input shaft as the input portion thereof; a rotation transmission shaft disposed in parallel to the input shaft; first, second and third planetary-gear-type transmissions disposed concentrically with each other on the periphery of the rotation transmission shaft; the first planetary-gear-type transmission including a first sun gear, a first ring gear, a plurality of first planetary gears meshingly engaged with the first sun and ring gears, and a first carrier supporting the respective first planetary gears so as to be rotated; the second planetary-gear-type transmission including a second sun gear, a second ring gear, a plurality of second planetary gears meshingly engaged with the second sun and ring gears, and a second carrier supporting the respective second planetary gears so as to be rotated; the third planetary-gear-type transmission including a third sun gear, a third ring gear, a plurality of third planetary gears meshingly engaged with the third sun and ring gears, and a third carrier supporting the respective third planetary gears so as to be rotated; an output gear disposed concentrically with the rotation transmission shaft; a first power transmission mechanism for transmitting the rotation of the input shaft to the first ring gear or the first carrier constituting the first planetary-gear-type transmission; a second power transmission mechanism for transmitting the rotation between the output portion of the toroidal-type continuously variable transmission and the rotation transmission shaft; a third power transmission mechanism for transmitting the rotation of the input shaft to the third ring gear or the third carrier constituting the third planetary-gear-type transmission; and, a switching mechanism for switching the power transmission states between the input shaft and the output shaft through the first, second and third power transmission mechanisms, wherein not only the second sun gear and one of the first and third sun gears are rotated together with the rotation transmission shaft to thereby execute the power transmission through the rotation transmission shaft and one of the first and second planetary-gear-type transmissions, but also, in a state where the power transmission through the third planetary-gear-type transmission is cut off, in accordance with the control of the transmission ratio of the toroidal-type continuously variable transmission, the output shaft is stopped while the input shaft is rotating.

According to a second aspect of the present invention, there is a continuously variable transmission apparatus, having: an input shaft; a toroidal-type continuously variable transmission disposed concentrically with the input shaft, including an input portion and an output portion and using the input shaft as the input portion thereof; a rotation transmission shaft disposed in parallel to the input shaft; first, second and third planetary-gear-type transmissions disposed concentrically with each other on the periphery of the rotation transmission shaft; the first planetary-gear-type transmission including a first sun gear, a first ring gear, a plurality of first planetary gears meshingly engaged with the first sun and ring gears, and a first carrier supporting the respective first planetary gears so as to be rotated; the second planetary-gear-type transmission including a second sun gear, a second ring gear, a plurality of second planetary gears meshingly engaged with the second sun and ring gears, and a second carrier supporting the respective second planetary gears so as to be rotated; the third planetary-gear-type transmission including a third sun gear, a third ring gear, a plurality of third planetary gears meshingly engaged with the third sun and ring gears, and a third carrier supporting the respective third planetary gears so as to be rotated; an output gear disposed concentrically with the rotation transmission shaft; a first power transmission mechanism for transmitting the rotation of the input shaft to the first ring gear constituting the first planetary-gear-type transmission; a second power transmission mechanism for transmitting the rotation between the output portion of the toroidal-type continuously variable transmission and the rotation transmission shaft; a third power transmission mechanism for transmitting the rotation of the input shaft to the third ring gear constituting the third planetary-gear-type transmission; a low-speed clutch for permitting and prohibiting the transmission of the power between the input shaft and the first ring gear; and, a high-speed clutch for permitting and prohibiting the transmission of the power between the third power transmission mechanism and the third planetary-gear-type transmission, wherein the first and second sun gears are rotated together with the rotation transmission shaft, the first carrier constituting the first planetary-gear-type transmission is connected with not only the output shaft but also the second ring gear constituting the second planetary-gear-type transmission, the second carrier constituting the second planetary-gear-type transmission is connected with the third carrier constituting the third planetary-gear-type transmission, and, in a state where the low-speed clutch is connected and the connection of the high-speed clutch is cut off, in accordance with the control of the transmission ratio of the toroidal-type continuously variable transmission, the output shaft is stopped while the input shaft is rotating.

According to a third aspect of the present invention, there is a continuously variable transmission apparatus, having: an input shaft; a toroidal-type continuously variable transmission disposed concentrically with the input shaft, including an input portion and an output portion and using the input shaft as the input portion thereof; a rotation transmission shaft disposed in parallel to the input shaft; first, second and third planetary-gear-type transmissions disposed concentrically with each other on the periphery of the rotation transmission shaft; the first planetary-gear-type transmission including a first sun gear, a first ring gear, a plurality of first planetary gears meshingly engaged with the first sun and ring gears, and a first carrier supporting the respective first planetary gears so as to be rotated; the second planetary-gear-type transmission including a second sun gear, a second ring gear, a plurality of second planetary gears meshingly engaged with the second sun and ring gears, and a second carrier supporting the respective second planetary gears so as to be rotated; the third planetary-gear-type transmission including a third sun gear, a third ring gear, a plurality of third planetary gears meshingly engaged with the third sun and ring gears, and a third carrier supporting the respective third planetary gears so as to be rotated; an output gear disposed concentrically with the rotation transmission shaft; a first power transmission mechanism for transmitting the rotation of the input shaft to the first carrier constituting the first planetary-gear-type transmission; a second power transmission mechanism for transmitting the rotation between the output portion of the toroidal-type continuously variable transmission and the rotation transmission shaft; a third power transmission mechanism for transmitting the rotation of the input shaft to the third carrier constituting the third planetary-gear-type transmission; a low-speed clutch for permitting and prohibiting the transmission of the power between the input shaft and the first planetary-gear-type transmission; and, a high-speed clutch for permitting and prohibiting the transmission of the power between the input shaft and the third carrier, wherein the second and third sun gears are rotated together with the rotation transmission shaft, the first and second ring gears constituting the first and second planetary-gear-type transmissions respectively are connected with each other, the second carrier constituting the second planetary-gear-type transmission is connected with not only the output shaft but also the third ring gear constituting the third planetary-gear-type transmission, and, in a state where the low-speed clutch is connected and the connection of the high-speed clutch is cut off, in accordance with the control of the transmission ratio of the toroidal-type continuously variable transmission, the output shaft is stopped while the input shaft is rotating.

According to the above-structured continuously variable transmission apparatus of the invention, since the center axis of the toroidal-type continuously variable transmission is disposed such that it is shifted in the diameter direction from the center axes of the first, second and third planetary-gear-type transmissions, the axial-direction dimension of the whole of the continuously variable transmission apparatus can be reduced. Also, because there can be realized a state in which the output shaft can be stopped while the input shaft is left rotating, that is, a state in which the transmission ratio can be set infinite, there can be eliminated the need to incorporate a start mechanism such as a torque converter into the continuously variable transmission apparatus separately. Further, the number of clutches, which are used to constitute the switching mechanism for switching the modes, can also be reduced. Still further, as the rotation shafts to be disposed in parallel to each other (shifted in the diameter direction from each other) in the continuously variable transmission apparatus portion, there may be disposed, in addition to the input shaft, only the rotation transmission shaft and output shaft (and the hollow rotation shafts disposed on the peripheries of the rotation transmission shaft and output shaft). This can save the space for arranging the rotation shafts, thereby being able to reduce the section area (regarding planes at right angles to the rotation shafts) of the continuously variable transmission apparatus. This makes it possible to realize a continuously variable transmission apparatus which is small in size and excellent in transmission efficiency.

DETAILED DESCRIPTION OF THE PREFERRED EMBODIMENTS

Figure 1:
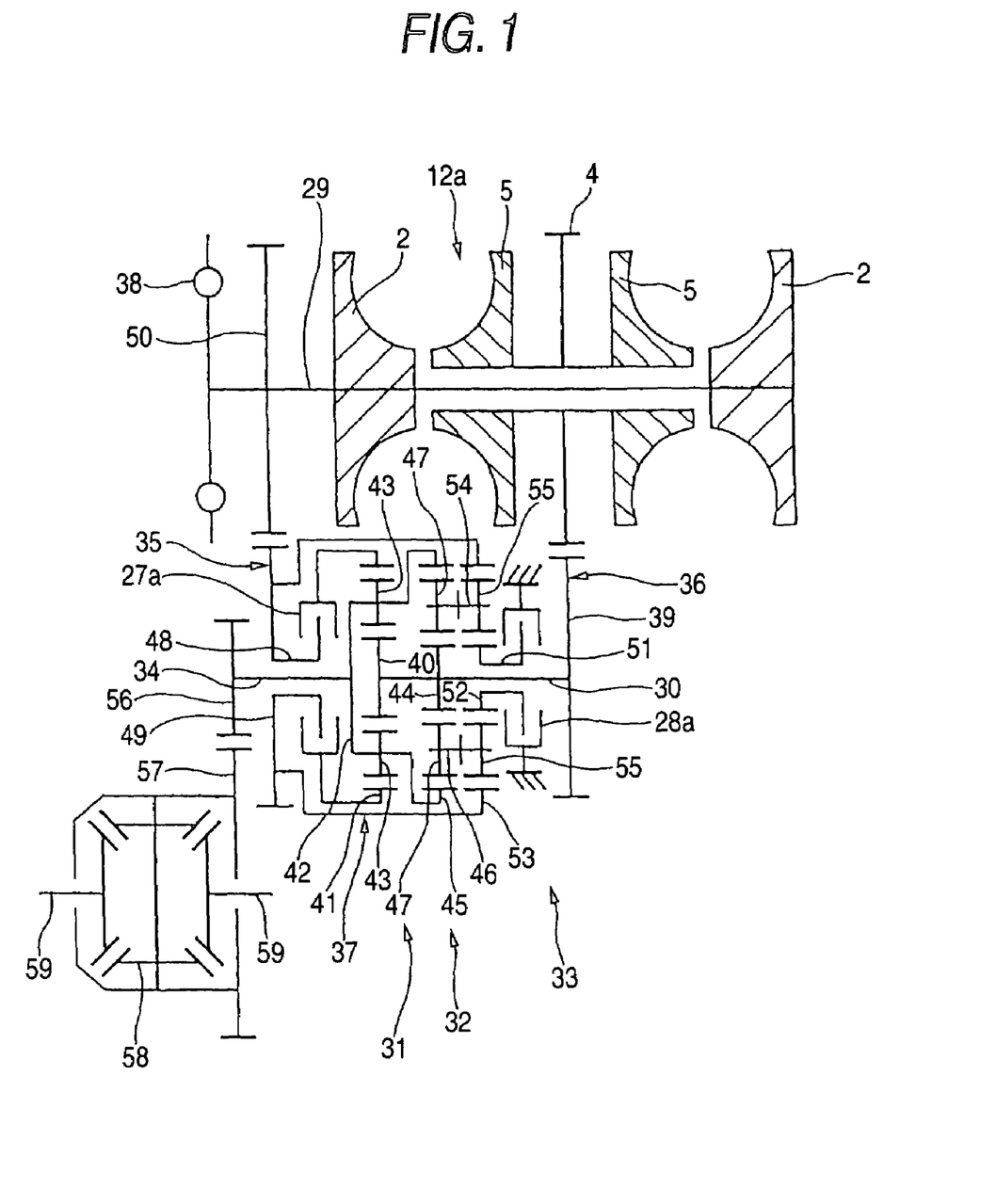
FIG. 1 is a schematic section view of a first embodiment of a continuously variable transmission apparatus according to the invention.

FIG. 1 shows a first embodiment of a continuously variable transmission apparatus according to the invention. The continuously variable transmission apparatus according to the present embodiment comprises an input shaft 29, a toroidal-type continuously variable transmission 12a, a rotation transmission shaft 30, first, second and third planetary-gear-type transmission 31, 32 and 33, an output shaft 34, first, second and third power transmission mechanisms 35, 36 and 37, and a low-speed clutch 27a and a high-speed clutch 28a respectively constituting a switching mechanism. Of these composing elements, the input shaft 29 is connected to the crankshaft of an engine through a damper joint 38, so that the input shaft 29 can be driven and rotated by this engine.

The toroidal-type continuously variable transmission 12a is similar in structure to the conventional structure shown in the above-discussed FIG. 3 and includes a pair of input side disks 2, 2 which can be rotated together with the input shaft 29. On the periphery of the middle portion of the input shaft 29, there are supported a pair of output side disks 5, 5 so as to be concentric with the two input side disks 2, 2 and can be rotated with respect to the two input side disks 2, 2. And, between the two sets of two input side disks 2, 2 and two output side disks 5, 5, there are interposed and held a plurality of power rollers 6, 6 (see FIGS. 3 and 4) in each set. Also, between the two output side disks 5, 5, there is interposed an output gear 4, so that the rotation power of the two output side disks 5, 5 can taken out by the output gear 4. The structure of the toroidal-type continuously variable transmission 12a as well as the operation for controlling the transmission ratio between the input shaft 29 and output gear 4 are respectively similar to those of the conventionally widely known toroidal-type continuously variable transmission.

Also, the rotation transmission shaft 30 is disposed in parallel to the input shaft 29. And, a gear 39, which is fixed to one end (in FIG. 1, the right end) of the rotation transmission shaft 30, is meshingly engaged with the output gear 4, thereby constituting the second power transmission mechanism 36. The reduction ratio of the second power transmission mechanism 36 is expressed as $R_{OPG}$. Therefore, the rotation transmission shaft 30 can be rotated in the opposite direction to the two output side disks 5, 5 at a speed corresponding to the reduction ratio $R_{OPG}$ as the two output side disks 5, 5 rotate. On the periphery of the rotation transmission shaft 30, there are disposed the first, second and third planetary-gear-type transmissions 31, 32 and 33 in such a manner that they are concentric with each other. These planetary-gear-type transmissions 31, 32 and 33 are respectively of a single pinion type (in which the same planetary gear is meshingly engaged with both of a sun gear and a ring gear).

Of the planetary-gear-type transmissions 31, 32 and 33, in order to constitute the first planetary-gear-type transmissions 31 that is nearest to the output shaft 34, a first sun gear 40 is disposed on the other end portion (in FIG. 1, the left end portion) of the rotation transmission shaft 30 in such a manner that it can be rotated together with the rotation transmission shaft 30. On the periphery of the first sun gear 40, there is rotatably supported a first ring gear 41. Also, a first carrier 42 is supported in such a manner that not only it is concentric with the first sun gear 40 and first ring gear 41 but also it can be rotated with respect to the two gears 40, 41. And, a plurality of (generally, three to four) first planetary gears 43, 43, which are respectively supported on the first carrier 42 so as to be rotatable, are meshingly engaged with the first sun gear 40 and first ring gear 41 respectively.

The thus-structured first ring gear 41, which constitutes the first planetary-gear-type transmission 31, is connected with the input shaft 29 through the first power transmission mechanism 35 in such a manner that they can transmit their rotations to each other. In the case of the illustrated embodiment, in order to constitute the first power transmission mechanism 35, a hollow rotation shaft 48 is disposed on the periphery of the middle portion of the output shaft 34 in such a manner that it can be rotated with respect to the output shaft 34. And, a gear 49 fixed to one end portion (in FIG. 1, the left end portion) of the hollow rotation shaft 48 is meshingly engaged with a gear 50 which is fixed to the input shaft 29. Also, the other end portion (in FIG. 1, the left end portion) of the hollow rotation shaft 48 can be engaged with and removed from the first ring gear 41 through the low-speed clutch 27a. The reduction ratio of the thus-structured first power transmission mechanism 35 is expressed as $R_{IPG}$. Therefore, in a state where the low-speed clutch 27a is connected, as the input shaft 29 rotates, the first ring gear 41 can be rotated in the opposite direction to the input shaft 29 at a speed corresponding to the reduction ratio $R_{IPG}$.

On the other hand, in order to constitute the second planetary-gear-type transmission 32 that is situated in the axial-direction middle portion, in the middle portion of the rotation transmission shaft 30, there is disposed a second sun gear 44 in such a manner that it can be rotated together with the rotation transmission shaft 30. On the periphery of the second sun gear 44, there is rotatably supported a second ring gear 45. The second ring gear 45 can be connected to the first carrier 42 constituting the first planetary-gear-type transmission 31 and thus can be rotated together with the first carrier 42. Also, a second carrier 46 is supported in such a manner that not only it is concentric with the second sun gear 44 and second ring gear 45 but also it can be rotated with respect to these two gears 44, 45. And, a plurality of second planetary gears 47, 47, which are respectively rotatably supported on the second carrier 46, are meshingly engaged with the second sun gear 44 and second ring gear 45.

Further, in order to constitute the third planetary-gear-type transmission 33 that is most distant from the output shaft 34, on the periphery of the one-end portion of the middle portion of the rotation transmission shaft 30, there is supported a hollow rotation shaft 51 in such a manner that it can be rotated with respect to the rotation transmission shaft 30. And, on one end (in FIG. 1, the left end) of the hollow rotation shaft 51, there is disposed a third sun gear 52 in such a manner that it can be rotated together with the hollow rotation shaft 51. On the periphery of the third sun gear 52, there is rotatably supported a third ring gear 53. The third ring gear 53 is connected through the cylindrically-formed third power transmission mechanism 37 to a gear 49 which constitutes the first power transmission mechanism 36. Therefore, the third ring gear 53 can be rotated in the opposite direction to the input shaft 29 at a speed corresponding to the reduction ratio $R_{IPG}$ of the first power transmission mechanism 35 as the input shaft 29 rotates.

Also, a third carrier 54 is supported in such a manner that not only it is concentric with the third sun gear 52 and third ring gear 53 but also it can be rotated with respect to these two gears 52 and 53. And, a plurality of third planetary gears 55, 55, which are respectively rotatably supported on the third carrier 54, are meshingly engaged with the third sun gear 52 and third ring gear 53. Also, between the other end (in FIG. 1, the right end) of the hollow rotation shaft 51 and a fixed portion such as a casing, there is interposed the above-mentioned high-speed clutch 28a. By the way, in the illustrated embodiment, the third carrier 54 is formed integrally with the second carrier 46 that constitutes the second planetary-gear-type transmission 32. Also, the third planetary gears 55, 55 and second planetary gears 47, 47 are supported concentrically with each other.

Further, the leading end portion (in FIG. 1, the left end portion) of the output shaft 34 is connected to a differential gear 58 through two gears 56, 57 which are meshingly engaged with each other. Therefore, when the output shaft 34 is rotated, a pair of right and left axle shafts 59, 59 are driven and rotated in the same direction through the two gears 56, 57 and differential gear 58; and thus, in accordance with the rotation direction of the output shaft 34, the car can be driven.

Now, the operation of the above-structured continuously variable transmission apparatus according to the present embodiment is as follows. Firstly, in a low speed mode state where the low-speed clutch 27a is connected and the connection of the high-speed clutch 28a is cut off, the rotation of the input shaft 29 is transmitted to the first ring gear 41 and first sun gear 40 constituting the first planetary-geartype transmission 31 through the following two paths ① and ②. By the way, in a state where the connection of the high-speed clutch 28a is cut off, the third sun gear 52 is freely rotatable; and, therefore, the power transmission between the third power transmission mechanism 37 and third planetary-gear-type transmission 33 is substantially cut off. Similarly, since the second carrier 46 is also freely rotatable, the second planetary-gear-type transmission 32 is also prevented from executing the rotation transmission between the second sun gear 44 and second ring gear 45.

① Input shaft 29 → gear 50 → gear 49 → hollow rotation shaft 48 → low-speed clutch 27a → first ring gear 41

② Input shaft 29 → toroidal-type continuously variable transmission 12a → output gear 4 → gear 39 → rotation transmission shaft 30 → first sun gear 40

In this state, a differential component between the first sun gear 40 and first ring gear 41 is taken out through the first carrier 42 as the rotation power of the respective first planetary gears 43, 43 around the first sun gear 40 and first ring gear 41. And, the present rotation power is then taken out from the output shaft 34 connected and fixed to the first carrier 42 through the gears 56, 57 by the differential gear 58, thereby driving and rotating the wheels of the car through the axle shafts 59, 59.

The speed ratio $e_{CVT}$ of the whole of the continuously variable transmission apparatus in the above-mentioned low speed mode state can be expressed by the following equation (1).

[Equation 1]

$$e_{CVT} = \frac{1}{1+i_1}\left(\frac{e_{CVU}}{R_{OPG}} + \frac{i_1}{R_{IPG}}\right) \quad (1)$$

The meanings of signs used in the equation (1) are as follows.

$e_{CVU}$: speed ratio of toroidal-type continuously variable transmission 12a $i_1$: ratio, $m_{41}/m_{40}$, of teeth number $m_{41}$ of first ring gear 41 to the teeth number $m_{40}$ of first sun gear 40

$R_{OPG}$: reduction ratio of second power transmission mechanism 36 constituted by gear 39 and output gear 4

$R_{IPG}$: reduction ratio of first power transmission mechanism 35 constituted by gear 49 and gear 50.

And, according to such low speed mode state, in case where the transmission ratio $e_{CVU}$ of the toroidal-type continuously variable transmission 12a is set as a value to be expressed by the following numeric equation (2), there can be realized a state of a so called infinite transmission ratio in which the output shaft 34 can be stopped while leaving the input shaft 29 rotating.

[Numeric equation 2]

$$e_{CVU} = -\frac{R_{OPG}}{R_{IPG}}i_1 \quad (2)$$

Also, by changing the transmission ratio $e_{CVU}$ of the toroidal-type continuously variable transmission 12a to the speed increasing side from the value expressed by the numeric equation (2), the respective axle shafts 59, 59 are rotated in a direction where the car can be backed. And, as the speed increasing ratio increases in value, the rotation speed of the axle shafts in the car backing direction increases. On the other hand, by changing the transmission ratio $e_{CVU}$ of the toroidal-type continuously variable transmission 12a to the speed reducing side from the value expressed by the numeric equation (2), the respective axle shafts 59, 59 are rotated in a direction where the car can be advanced. And, as the speed reducing ratio increases in value, the rotation speed of the axle shafts in the car advancing direction increases. By the way, in case where the absolute value of the right side of the numeric equation (2) is set as the transmission ratio that can be realized by the toroidal-type continuously variable transmission 12a, for example, within the range of 0.4~2.5, an infinite transmission ratio state can be realized in the low speed mode state.

On the other hand, in a high speed mode state in which the connection of the low-speed clutch 27a is cut off and the high-speed clutch 28a is connected, the rotation of the input shaft 29 is transmitted through the following two paths ③ and ④ to the second carrier 46 and second sun gear 44 which cooperate together in constituting the second planetary-gear-type transmission 32.

③ Input shaft 29 → gear 50 → gear 49 → third power transmission mechanism 37 → third ring gear 53 → third planetary gears 55, 55 → second carrier 46 (third carrier 54)

④ Input shaft 29 → toroidal-type continuously variable transmission 12a → output gear 4 → gear 39 → rotation transmission shaft 30 → second sun gear 44.

In this state, a differential component between the second sun gear 44 and second carrier 46 is taken out through the first carrier 42 as the rotation power of the second ring gear 45. And, the present rotation power is then taken out from the output shaft 34 connected and fixed to the first carrier 42 through the gears 56, 57 by the differential gear 58, thereby driving and rotating the wheels of the car through the axle shafts 59, 59.

The speed ratio $e_{CVT}$ of the whole of the continuously variable transmission apparatus in the above-mentioned high speed mode state can be expressed by the following equation (3).

[Equation 3]

$$e_{CVT} = \frac{1}{i_2}\left(\frac{(1+i_2)\cdot i_3}{R_{IPG}\cdot(1+i_3)} - \frac{e_{CVU}}{R_{OPG}}\right) \quad (3)$$

In this equation (3), the meanings of signs not shown before are as follows.

$i_2$: ratio, $m_{45}/m_{44}$, of teeth number $m_{45}$ of second ring gear 45 to teeth number $m_{44}$ of second sun gear 44

$i_3$: ratio, $m_{53}/m_{52}$ of teeth number $m_{53}$ of third ring gear 53 to the teeth number $m_{52}$ of third sun gear 52.

As can be clearly seen from the above numeric equation (3), according to the above high speed mode state, in case where the transmission ratio $e_{CVU}$ of the toroidal-type continuously variable transmission 12a is increased toward the speed increasing side, the transmission ratio $e_{CVT}$ of the whole of the continuously variable transmission apparatus is also varied toward the speed increasing side.

In the present high speed mode state, assuming that a torque to be transmitted from the engine to the input shaft 29 is expressed as $T_e$, a toque $T_{CVU}$ passing through the toroidal-type continuously variable transmission 12a can be expressed by the following numeric equation (4). The meanings of marks used in this equation are as described previously. Also, the value of the transmission ratio $e_{CVU}$ of the toroidal-type continuously variable transmission 12a, in this numeric equation (4), provides a negative value.

[Numeric equation 4]

$$T_{CVU} = \frac{1}{\left(1 - \frac{(1+i_2)i_3 \cdot R_{OPG}}{(R_{IPG} \cdot (1+i_3) \cdot e_{CVU})}\right)} T_e \quad (4)$$

As can be clearly seen from the above numeric equation (4), according to the above high speed mode state, there can be always obtained the relationship such that $T_{CVU} < T_e$. This means that, in the high speed mode state, the toque $T_{CVU}$ passing through the toroidal-type continuously variable transmission 12a is reduced, so that both of the transmission efficiency and durability of the toroidal-type continuously variable transmission 12a can be thereby enhanced.

Also, as can be seen clearly from the equations (1) and (3), there exists the speed ratio $e_{CVU}$ of the toroidal-type continuously variable transmission 12a that allows the speed ratio $e_{CVT}$ of the whole of the continuously variable transmission apparatus in the low speed mode state expressed by the equation (1) to coincide with the speed ratio $e_{CVT}$ of the whole of the continuously variable transmission apparatus in the high speed mode state expressed by the equation (3). Thus, the low and high speed modes are to be switched over to each other in a state where the speed ratios $e_{CVT}$ respectively expressed by the equations (1) and (3) coincide with each other. That is, when the speed ratio $e_{CVU}$ of the toroidal-type continuously variable transmission 12a provides such a value that allows the speed ratios $e_{CVT}$ respectively expressed by the equations (1) and (3) to coincide with each other, the low-speed and high-speed clutches 27a and 28a are to be connected and disconnected.

Figure 2:
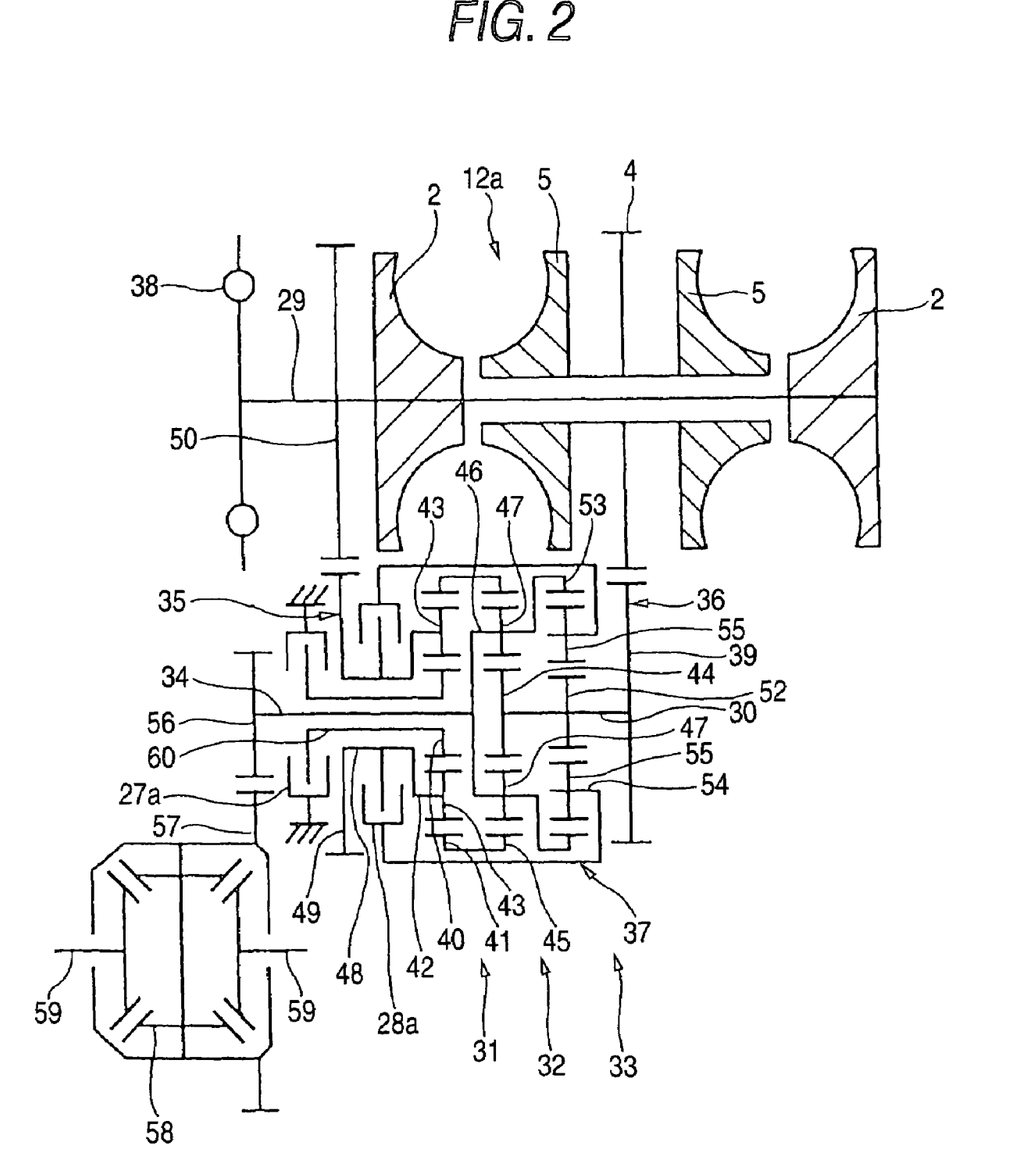
FIG. 2 is a schematic section view of a second embodiment of a continuously variable transmission apparatus according to the invention.

Next, FIG. 2 shows a second embodiment of a continuously variable transmission apparatus according to the invention. The present continuously variable transmission apparatus also comprises an input shaft 29, a toroidal-type continuously variable transmission 12a, a rotation transmission shaft 30, first, second and third planetary-gear-type transmissions 31, 32 and 33, an output shaft 34, first, second and third power transmission mechanisms 35, 36 and 37, and a low-speed clutch 27a and a high-speed clutch 28a respectively constituting a switching mechanism. The structure of the present embodiment and the structure of the previously described first embodiment have many composing parts in common. Therefore, like parts are given the same designations and the duplicate description thereof is omitted or simplified. Thus, description will be given below mainly of the parts thereof that are different from the first embodiment.

In the case of the present embodiment, on the periphery of the middle portion of the output shaft 34, there is disposed a hollow rotation shaft 60 and, on one end (in FIG. 2, the right end) of the hollow rotation shaft 60, there is disposed a first sun gear 40 constituting the first planetary-gear-type transmission 31 in such a manner that it can be rotated in synchronization with the hollow rotation shaft 60. Also, the low-speed clutch 27a is interposed between the other end (in FIG. 2, the left end) of the hollow rotation shaft 60 and a fixed portion such as a casing. A hollow rotation shaft 48, which is used to constitute the first power transmission mechanism 35, is disposed on the periphery of the hollow rotation shaft 60 in such a manner that it can be rotated with respect to the hollow rotation shaft 60. And, the other end portion (in FIG. 2, the right end portion) of the hollow rotation shaft 48, on one end portion (in FIG. 2, the left end portion) of which there is disposed a gear 49, is connected with a first carrier 42 which constitutes first planetary-gear-type transmission 31.

And, the middle portion of the hollow rotation shaft 48 is connected with one end (in FIG. 2, the left end) of the third power transmission mechanism 37 through the high-speed clutch 28a. Also, the other end (in FIG. 2, the right end) of the third power transmission mechanism 37 is connected to a third carrier 54 constituting the third planetary-gear-type transmission 33. Further, a first ring gear 41 constituting the first planetary-gear-type transmission 31 is connected with a second ring gear 45 constituting the second planetary-gear-type transmission 32, where by the two ring gears 41 and 45 can be rotated in synchronization with each other. Still further, a second carrier 46 constituting the second planetary-gear-type transmission 32 is connected with not only the base end portion (in FIG. 2, the right end portion) of the output shaft 34 but also a third ring gear 53 constituting the third planetary-gear-type transmission 33. In addition, on the rotation transmission shaft 30, there are disposed a second sun gear 44 constituting the second planetary-gear-type transmission 32 and a sun gear 52 constituting the third planetary-gear-type transmission 33 in such a manner that they can be rotated in synchronization with the rotation transmission shaft 30.

Now, the operation of the above-structured continuously variable transmission apparatus according to the present embodiment is as follows. Firstly, in a low speed mode state where the low-speed clutch 27a is connected and the connection of the high-speed clutch 28a is cut off, the rotation of the input shaft 29 is transmitted to the second ring gear 45 and second sun gear 44 constituting the second planetary-gear-type transmission 32 through the following two paths ⑤ and ⑥.

⑤ Input shaft 29 → gear 50 → gear 49 → hollow rotation shaft 48 → first carrier 42 → first planetary gears 43, 43 → first ring gear 41 → second ring gear 45

⑥ Input shaft 29 toroidal-type continuously variable transmission 12a → output gear 4 → gear 39 → rotation transmission shaft 3 → second sun gear 44

In this state, a differential component between the second sun gear 44 and second ring gear 45 is taken out through the second carrier 46 as the rotation movements of the second planetary gears 47, 47 constituting the second planetary-gear-type transmission 32 around the sun gear 44. And, these rotation movements are then taken out from the output shaft 34, which is connected and fixed to the second carrier 46, to the differential gear 58 through the gears 56, 57, thereby driving and rotating the wheels of a car through a pair of axle shafts 59, 59. By the way, in a state where the connection of the high-speed clutch 28a is cut off, since the third carrier 54 can be rotated freely, the power transmission between the third sun gear and third ring gear is not be executed.

The speed ratio $e_{CVT}$ of the whole of the continuously variable transmission apparatus in the above-mentioned low speed mode state can be expressed by the following equation (5).

[Equation 5]

$$e_{CVT} = \frac{1}{1+i_1}\left(\frac{e_{CVU}}{R_{OPG}} + \frac{i_1(1+i_3)}{R_{IPG} \cdot i_3}\right) \quad (5)$$

The meanings of signs used in the equation (5) are the same as in the previously described equations (1)–(4).

And, in this low speed mode state, in case where the speed ratio $e_{CVU}$ of the toroidal-type continuously variable transmission 12a is set for a value which can be expressed by the following equation (6), there can be realized a state in which a transmission ratio can be set infinite and thus the output shaft 34 can be stopped while leaving the input shaft 29 rotating.

[Equation 6]

$$e_{CVU} = -\frac{R_{OPG}(1+i_3)}{R_{IPG} \cdot i_3} i_1 \tag{6}$$

Also, in case where the speed ratio $e_{CVU}$ of the toroidal-type continuously variable transmission 12a is changed from the value expressed by the following equation (6) over to the speed increasing side, the respective axle shafts 59, 59 are rotated in a direction to back the car. And, as the speed increasing ratio increases, the rotation speed in the backing direction increases. On the other hand, in case where the speed ratio $e_{CVU}$ of the toroidal-type continuously variable transmission 12a is changed from the value expressed by the following equation (6) over to the speed reducing side, the respective axle shafts 59, 59 are rotated in a direction to advance the car. And, as the speed reducing ratio increases, the rotation speed in the advancing direction increases. By the way, in case where the absolute value of the right side of the equation (6) is set for the transmission ratio that can be realized by the toroidal-type continuously variable transmission 12a, for example, in the range of 0.4–2.5, in the low speed mode state, there can be realized a state in which a transmission ratio can be set infinite.

On the other hand, in a high speed mode state in which the connection of the low-speed clutch 27a is cut off and the high-speed clutch 28a is connected, the rotation of the input shaft 29 is transmitted through the following two paths ⑦ and ⑧ to the third carrier 54 and third sun gear 52 which cooperate together in constituting the third planetary-gear-type transmission 33. By the way, in a state where the connection of the low-speed clutch 27a is cut off, since the first sun gear 40 can be rotated freely, the power transmission between the input shaft 29 and first planetary-gear-type transmission 31 is substantially cut off.

⑦ Input shaft 29 → gear 50 → gear 49 → third power transmission mechanism 37 → third carrier 54

⑧ Input shaft 29 → toroidal-type continuously variable transmission 12a → output gear 4 → gear 39 → rotation transmission shaft 30 → third sun gear 52

In this state, a differential component between the third sun gear 52 and third carrier 54 is taken out through the second carrier 46 connected to the third ring gear 53 as the rotation movement of the third ring gear 53. And, the rotation movement is then taken out from the output gear 34 connected and fixed to the second carrier 46 through the gears 56, 57 by the differential gear 58, thereby driving and rotating the wheels of the car through the two axle shafts 59, 59.

The speed ratio $e_{CVT}$ of the whole of the continuously variable transmission apparatus in the above-mentioned high speed mode state can be expressed by the following equation (7).

[Equation 7]

$$e_{CVT} = \frac{1}{i_2}\left(\frac{1+i_2}{R_{IPG}} - \frac{e_{CVU}}{R_{OPG}}\right) \tag{7}$$

The meanings of signs used in the equation (7) are also the same as in the previously described equations (1)–(4).

As can be seen clearly from the equation (7), in the high speed mode state, as the speed ratio $e_{CVU}$ of the toroidal-type continuously variable transmission 12a is changed to the speed increasing side, the speed ratio $e_{CVT}$ of the whole of the continuously variable transmission apparatus is also changed to the speed increasing side.

Also, in such high speed mode state, in case where the torque to be transmitted from the engine to the input shaft 29 is expressed as $T_e$, the torque $T_{CVU}$ passing through the toroidal-type continuously variable transmission 12a can be expressed by the following equation (8). The meanings of signs used in the equation (8) are the same as described above. Also, the value of the speed ratio $e_{CVU}$ of the toroidal-type continuously variable transmission 12a is negative.

[Equation 8]

$$T_{CVU} = \frac{1}{\left(1 - \frac{(1+i_2) \cdot R_{OPG}}{R_{IPG} \cdot e_{CVU}}\right)} T_e \tag{8}$$

As can be seen clearly from the equation (8), in the high speed mode state, the torque $T_{CVU}$ passing through the toroidal-type continuously variable transmission 12a is lowered, so that the transmission efficiency and durability of the toroidal-type continuously variable transmission 12a are both enhanced.

Also, as can be seen clearly from the equations (5) and (7), there exists the speed ratio $e_{CVU}$ of the toroidal-type continuously variable transmission 12a that allows the speed ratio $e_{CVT}$ of the whole of the continuously variable transmission apparatus in the low speed mode state expressed by the equation (5) to coincide with the speed ratio $e_{CVT}$ of the whole of the continuously variable transmission apparatus in the high speed mode state expressed by the equation (7). Thus, in the present embodiment as well, when the speed ratio $e_{CVU}$ of the toroidal-type continuously variable transmission 12a provides the value that allows the speed ratios $e_{CVT}$ respectively expressed by the equations (5) and (7) to coincide with each other, the low-speed and high speed clutches 27a and 28a are connected and disconnected. The present invention is explained in reference to a half-toroidal-type continuously variable transmission. However, the present invention may have applicability to full-toroidal-type continuously variable transmission.

Since the invention is structured and operated in the above-mentioned manner, there can be realized a continuously variable transmission apparatus which is small in the axial-direction dimension and section area thereof, can provide a large with of transmission ratio, and can omit a start device. Thanks to this, the invention can contribute toward enhancing the practical use of the continuously variable transmission apparatus as an automatic transmission for a small-sized car such as an FF car.

What is claimed is:

1. A continuously variable transmission apparatus, comprising:

an input shaft;

a toroidal-type continuously variable transmission disposed concentrically with the input shaft, including an input portion and an output portion and using the input shaft as the input portion thereof;

a rotation transmission shaft disposed in parallel to the input shaft;

first, second and third planetary-gear-type transmissions disposed concentrically with each other on the periphery of the rotation transmission shaft;

the first planetary-gear-type transmission including a first sun gear, a first ring gear, a plurality of first planetary gears meshingly engaged with the first sun and ring gears, and a first carrier supporting the respective first planetary gears so as to be rotated;

the second planetary-gear-type transmission including a second sun gear, a second ring gear, a plurality of second planetary gears meshingly engaged with the second sun and ring gears, and a second carrier supporting the respective second planetary gears so as to be rotated;

the third planetary-gear-type transmission including a third sun gear, a third ring gear, a plurality of third planetary gears meshingly engaged with the third sun and ring gears, and a third carrier supporting the respective third planetary gears so as to be rotated;

an output shaft disposed concentrically with the rotation transmission shaft;

a first power transmission mechanism for transmitting the rotation of the input shaft to the first carrier constituting the first planetary-gear-type transmission;

a second power transmission mechanism for transmitting the rotation between the output portion of the toroidal-type continuously variable transmission and the rotation transmission shaft;

a third power transmission mechanism for transmitting the rotation of the input shaft to the third carrier constituting the third planetary-gear-type transmission;

a low-speed clutch for permitting and prohibiting the transmission of the power between the input shaft and the first planetary-gear-type transmission; and, a high-speed clutch for permitting and prohibiting the transmission of the power between the input shaft and the third carrier, wherein the second and third sun gears are rotated together with the rotation transmission shaft, the first and second ring gears constituting the first and second planetary-gear-type transmissions respectively are connected with each other, the second carrier constituting the second planetary-gear-type transmission is connected with not only the output shaft but also the third ring gear constituting the third planetary-gear-type transmission, and, in a state where the low-speed clutch is connected and the connection of the high-speed clutch is cut off, in accordance with the control of the transmission ratio of the toroidal-type continuously variable transmission, the output shaft is stopped while the input shaft is rotating.

* * * * *